A. F. & T. M. STANSBURY.
Cultivator.
No. 62,898.
Patented Mar. 12, 1867.
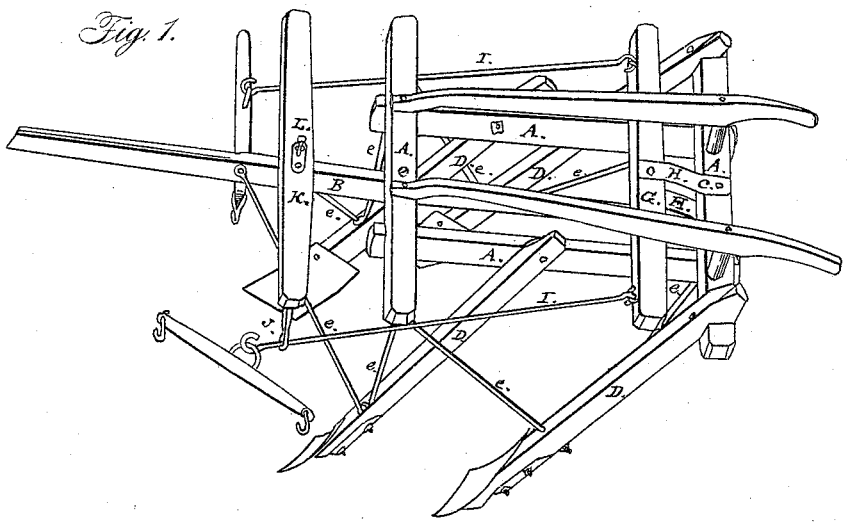
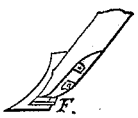
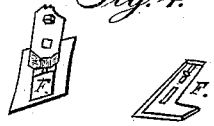
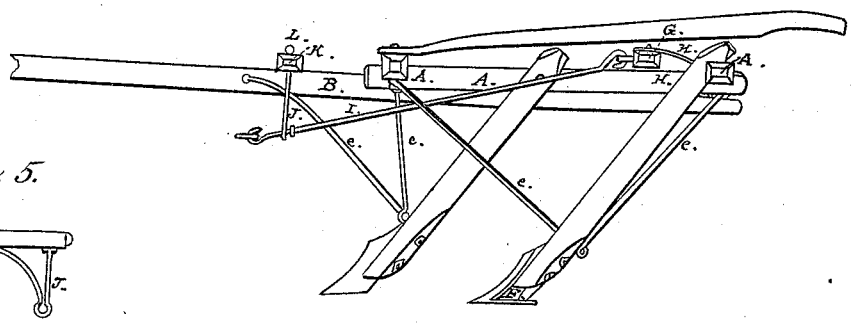
Witnesses:
Alex Hall
Inventor:
Alexander F. Stansbury
Thomas M. Stansbury

United States Patent Office.

ALEXANDER F. AND THOMAS M. STANSBURY, OF LEWISTOWN, ILLINOIS.

Letters Patent No. 62,898, dated March 12, 1867.

IMPROVEMENT IN CULTIVATORS.

*The Schedule referred to in these Letters Patent and making part of the same.*

TO ALL WHOM IT MAY CONCERN:

Be it known that we, ALEXANDER F. STANSBURY and THOMAS M. STANSBURY, of Lewistown, in the county of Fulton, and State of Illinois, have invented a new and useful Improvement in the Method of Making Cultivators for corn or other products growing in rows; and we do hereby declare that the following is a full, clear, and exact description of the construction and operation of the same, reference being had to the annexed drawings, making a part of this specification, in which—

Figure 1 is a perspective view.
Figure 2 is a longitudinal elevation.
Figure 3 is a side view of mould-board and shoe.
Figure 4 is a sub-view of mould-board and shoe.
Figure 5 is a side view of front double-tree and draught-brace or staple.

The nature of our invention consists in so applying the power that there is but little draught weight on the horses' necks, and the depth of front furrows is regulated in using adjustable shoes or bearers on rear shovels to regulate the depth of their cut.

To enable others skilled in the art to make and use our invention, we will here describe its construction and operation.

To the rectangular frame composed of beams, A A A A, we secure the tongue B, the rear end of which is depressed by washers, that front end may have proper elevation. The posts D D D D are bolted to frame, and stayed by rods $e\ e\ e\ e\ e\ e\ e$. Diamond shovels are secured to the posts, but between the rear posts and their shovels are fastened iron bearers or shoes, F, having slotted shanks to receive bolts which secure shovels. By the position of these shoes we regulate the cut of rear shovels, for by depressing the shovel F by means of the slot in their shanks, thus bringing them nearer the cutting edge of rear shovels, will bear them up, and cause their cut to be less in depth, and by elevating said shoes or removing them farther from the cutting edge of said shovels, will cause their cut to be deeper. The double-tree G, is secured to frame by clevis-bars or straps, H H, and to each end of G are attached draught-rods, I I, connecting with single-trees. The draught-rods pass through closed staples or braces, J, (fig. 5,) pendent to double-tree K, which is attached to B by bolt L. Washers between K and B will regulate the cut of front shovels, for if the cut be too much, then we take out some of the washers, which lowers the position of K, and consequently of the braces J, and the draught-rods I I will then have a stronger bearing against the upper side of the closed staples J, and will elevate the front shovels.

What we claim as our invention, and desire to secure by Letters Patent, is—

The slotted shoe or bearer F, the double-trees K and G, the clevis-bars H, draught-rods I, and pendent staples J, all substantially as and for the uses and purposes hereinbefore set forth, and we disclaim all other parts of such cultivator.

ALEXANDER F. STANSBURY.
THOS. M. STANSBURY.

Witnesses:
ALEX. HULL,
SAML. S. TIPTON.